(12) United States Patent
Slane et al.

(10) Patent No.: US 10,899,427 B2
(45) Date of Patent: Jan. 26, 2021

(54) HEATED FLOOR PANEL WITH IMPACT LAYER

(71) Applicant: Goodrich Corporation, Charlotte, NC (US)

(72) Inventors: Casey Slane, Tallmadge, OH (US); Nathaniel Ching, Hartville, OH (US); Wenping Zhao, Glastonbury, CT (US); Daniel Waina, Uniontown, OH (US); Jin Hu, Hudson, OH (US); Brandon Hein, Stow, OH (US); George F. Owens, Akron, OH (US); James A. Mullen, Wadsworth, OH (US)

(73) Assignee: Goodrich Corporation, Charlotte, NC (US)

( * ) Notice: Subject to any disclaimer, the term of this patent is extended or adjusted under 35 U.S.C. 154(b) by 220 days.

(21) Appl. No.: 16/026,899

(22) Filed: Jul. 3, 2018

(65) Prior Publication Data

US 2020/0010169 A1 Jan. 9, 2020

(51) Int. Cl.
*H05B 3/20* (2006.01)
*H05B 3/28* (2006.01)
(Continued)

(52) U.S. Cl.
CPC .................. *B64C 1/18* (2013.01); *B32B 3/12* (2013.01); *B32B 5/02* (2013.01); *B32B 5/18* (2013.01); *B32B 15/14* (2013.01); *B32B 15/18* (2013.01); *B32B 15/20* (2013.01); *B64C 1/00* (2013.01); *H05B 3/286* (2013.01); *B32B 2260/021* (2013.01); *B32B 2260/046* (2013.01); *B32B 2262/101* (2013.01); *B32B 2262/103* (2013.01); *B32B 2262/106* (2013.01);
(Continued)

(58) Field of Classification Search
CPC ............ H05B 2203/026; H05B 1/0236; H05B 3/20–267; H05B 3/28–30
See application file for complete search history.

(56) References Cited

U.S. PATENT DOCUMENTS

| 949,389 A | | 2/1910 | Almgren | |
|---|---|---|---|---|
| 4,990,755 A | * | 2/1991 | Nishimura | ............. H05B 3/146 219/549 |

(Continued)

FOREIGN PATENT DOCUMENTS

| EP | 1638371 A1 | 3/2006 |
|---|---|---|
| EP | 2113456 A2 | 11/2009 |

(Continued)

OTHER PUBLICATIONS

Extended European Search Report for EP Application No. 19183864.8, dated Oct. 31, 2019, pp. 8.
(Continued)

*Primary Examiner* — Michael A Laflame, Jr.
(74) *Attorney, Agent, or Firm* — Kinney & Lange, P. A.

(57) ABSTRACT

A heated floor panel assembly with an impact layer is made to absorb blunt force and protect a heating element inside the assembly. The assembly further includes a plurality of structural layer made of a reinforced polymer matrix, one or more core layer with a honeycomb or foam structure for absorbing shear stress, and a heating layer containing the heating element. The impact layer is a composite layer with a resin impregnated fiber matrix.

20 Claims, 4 Drawing Sheets

US 10,899,427 B2

Page 2

(51) Int. Cl.
*B64C 1/18* (2006.01)
*B32B 3/12* (2006.01)
*B32B 5/02* (2006.01)
*B32B 5/18* (2006.01)
*B32B 15/14* (2006.01)
*B32B 15/18* (2006.01)
*B32B 15/20* (2006.01)
*B64C 1/00* (2006.01)

(52) U.S. Cl.
CPC ... *B32B 2307/542* (2013.01); *B32B 2307/558* (2013.01); *B32B 2307/72* (2013.01); *B32B 2605/18* (2013.01); *B64C 2001/0072* (2013.01); *B64C 2001/0081* (2013.01)

(56) References Cited

U.S. PATENT DOCUMENTS

| | | | |
|---|---|---|---|
| 5,175,198 A | 12/1992 | Minnick et al. | |
| 5,451,747 A | 9/1995 | Sullivan et al. | |
| 5,547,735 A | 8/1996 | Roebroeks et al. | |
| 5,806,796 A | 9/1998 | Healey | |
| 6,429,157 B1 | 8/2002 | Kishi et al. | |
| 6,519,835 B1 | 2/2003 | Von Arx et al. | |
| 6,611,659 B2 * | 8/2003 | Meisiek | B64C 1/18 219/213 |
| 6,825,137 B2 | 11/2004 | Fu et al. | |
| 6,834,159 B1 | 12/2004 | Schramm | |
| 7,087,296 B2 | 8/2006 | Porter | |
| 7,247,822 B2 | 7/2007 | Johnston | |
| 7,800,028 B2 | 9/2010 | Wang | |
| 8,070,994 B2 * | 12/2011 | Carlson | B29C 44/1228 264/46.5 |
| 8,158,245 B2 | 4/2012 | Pratte et al. | |
| 8,286,919 B2 | 10/2012 | Gerken et al. | |
| 8,523,113 B2 | 9/2013 | Atkinson | |
| 8,752,279 B2 | 6/2014 | Brittingham et al. | |
| 8,772,676 B2 | 7/2014 | Augustine et al. | |
| 9,161,393 B2 | 10/2015 | Kaiserman et al. | |
| 9,253,823 B2 | 2/2016 | Nordman et al. | |
| 9,427,940 B2 | 8/2016 | Bremmer et al. | |
| 9,493,894 B2 | 11/2016 | Butler et al. | |
| 9,550,330 B2 | 1/2017 | Pratte et al. | |
| 9,593,917 B2 | 3/2017 | Pilpel | |
| 9,630,701 B2 | 4/2017 | Hu | |
| 9,736,888 B2 | 8/2017 | Duce et al. | |
| 9,782,944 B2 | 10/2017 | Martin et al. | |
| 9,855,721 B2 | 1/2018 | Drexler et al. | |
| 9,914,522 B2 | 3/2018 | Nehring | |
| 9,939,087 B2 | 4/2018 | Kolarski et al. | |
| 2004/0078976 A1 * | 4/2004 | Ahn | B32B 3/12 29/897.32 |
| 2005/0042416 A1 * | 2/2005 | Blackmon | B32B 3/12 428/116 |
| 2006/0138279 A1 | 6/2006 | Pisarski | |
| 2008/0210820 A1 | 9/2008 | Kismarton et al. | |
| 2009/0011210 A1 | 1/2009 | Gao et al. | |
| 2009/0236327 A1 | 9/2009 | Everly et al. | |
| 2009/0321414 A1 | 12/2009 | Dohring et al. | |
| 2011/0108545 A1 * | 5/2011 | Wang | H05B 3/283 219/546 |
| 2012/0234819 A1 | 9/2012 | Berger | |
| 2014/0044914 A1 | 2/2014 | Kurtz et al. | |
| 2014/0071216 A1 | 3/2014 | Hu et al. | |
| 2015/0053663 A1 | 2/2015 | Sakota et al. | |
| 2015/0076137 A1 * | 3/2015 | Kim | H05B 3/20 219/553 |
| 2015/0373782 A1 * | 12/2015 | Kang | H05B 3/34 219/541 |
| 2016/0007474 A1 | 1/2016 | Dardona et al. | |
| 2016/0121993 A1 * | 5/2016 | Nehring | B64C 1/18 244/118.5 |
| 2016/0297509 A1 | 10/2016 | Estadieu et al. | |
| 2016/0340020 A1 | 11/2016 | Owens et al. | |
| 2016/0361889 A1 | 12/2016 | Bartolome | |
| 2017/0050395 A1 | 2/2017 | Vos et al. | |
| 2017/0158898 A1 | 6/2017 | Xiao et al. | |
| 2017/0238369 A1 | 8/2017 | Owens et al. | |
| 2017/0245326 A1 | 8/2017 | Rivat et al. | |
| 2017/0254065 A1 | 9/2017 | Hegenbart et al. | |
| 2018/0050523 A1 | 2/2018 | Pilpel et al. | |
| 2018/0057748 A1 | 3/2018 | Hochstetter et al. | |
| 2018/0124874 A1 | 5/2018 | Dardona et al. | |
| 2018/0127081 A1 | 5/2018 | Toral Vazquez et al. | |
| 2018/0176989 A1 | 6/2018 | Hu et al. | |
| 2020/0010169 A1 * | 1/2020 | Slane | B64C 1/00 |

FOREIGN PATENT DOCUMENTS

| | | |
|---|---|---|
| EP | 3015360 A1 | 5/2016 |
| EP | 3095690 A2 | 11/2016 |
| EP | 3339013 A1 | 6/2018 |
| GB | 1444718 A | 8/1976 |
| JP | H0732518 A | 2/1995 |
| JP | 4862913 B2 | 1/2012 |
| WO | WO2012087294 A1 | 6/2012 |
| WO | WO2017186895 A1 | 11/2017 |

OTHER PUBLICATIONS

Extended European Search Report for EP Application No. 19183891.1, dated Nov. 4, 2019, pp. 7.
Extended European Search Report for EP Application No. 19182513.2, dated Nov. 28, 2019, pp. 6.
Extended European Search Report for EP Application No. 19184091.7, dated Nov. 28, 2019, pp. 6.
Extended European Search Report for EP Application No. 19183571.9, dated Nov. 29, 2019, pp. 7.
Extended European Search Report for EP Application No. 19183876.2, dated Oct. 25, 2019, pp. 5.

* cited by examiner

HEATED FLOOR PANEL WITH IMPACT LAYER

BACKGROUND

This application relates generally to heated floor panel assemblies for aircraft, and specifically to impact protection of heated floor panel assemblies.

Heated floor panels are often used in aircraft to mitigate the effects of cold underfloor temperatures and to help maintain a comfortable cabin temperature. The floor panels are typically supported by an aircraft structure arranged, for example, in a grid-like pattern. The floor panels have structural integrity sufficient to support the weight of people and objects resting on the panels. Heated floor panels must be able to withstand impacts from punctures from high heels, chips from dropped objects, scratches from dragged luggage, and/or other floor-traffic related hazards.

SUMMARY

A floor panel assembly has a bottom surface and a top surface. The floor panel assembly includes a first stack of structural layers adjacent the bottom surface, a first core layer, adjacent the first stack of structural layers, that absorbs shear stress, a second stack of structural layers between the core layer and the top surface, a heating layer between the core layer and the top surface, and an first impact layer between the heating layer and the top surface. The impact layer includes a fiber matrix and a thermoplastic or elastomer resin infiltrating the fiber matrix. The first stack of structural layers, the core layer, the second stack of structural layers, the heating layer, and the impact layer are bonded together.

DETAILED DESCRIPTION

The present invention is directed to a composite panel, and more specifically, to a heated floor panel assembly with increased impact protection. The panel includes structural layers, at least one core layer for absorbing shear stress, and at least one impact layer for absorbing blunt force, in addition to a heating layer containing a heating element. The impact layer can be infiltrated with fibers or wires to increase blunt impact resistance, or impregnated with a high toughness elastomeric resin. Multiple core layers or multiple impact layers can be used to increase impact resistance of the assembly. Alternatively, the heating layer can be moved further within the heated floor panel assembly to protect the heating element.

Figure 1:
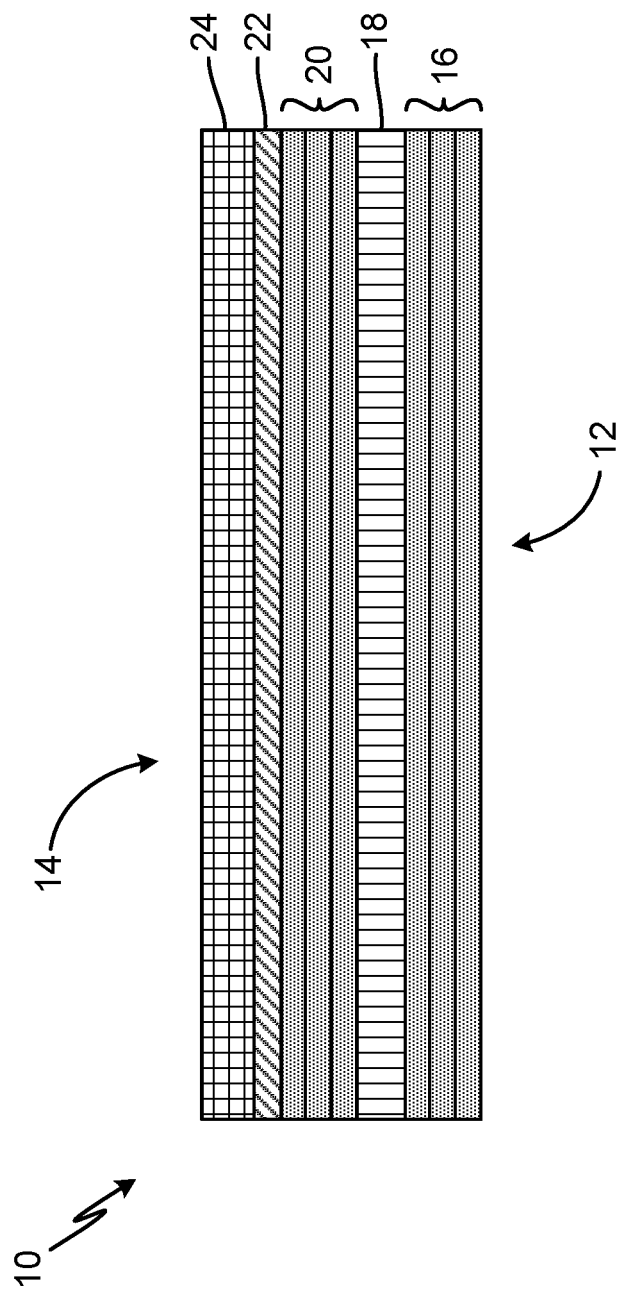
FIG. 1 is a schematic diagram of a heated floor panel assembly.

FIG. 1 is a schematic diagram of heated floor panel assembly 10 having bottom surface 12 and top surface 14. Assembly 10 contains first stack of structural layer 16, core layer 18, second stack of structural layers 20, heating layer 22, and impact layer 24. Assembly 10 can be held together by film adhesives (not shown) as needed between the components.

Bottom surface 12 of assembly 10 is anchored to an aircraft, while top surface 14 faces the inside of an aircraft cabin or other floor area needing to be heated. Components 16, 18, 20, 22, and 24 are arranged between bottom surface 12 and top surface 14. First stack of structural layers 16 is attached to bottom surface 12. Core layer 18 is attached to first stack of structural layers 16 opposite bottom surface 12. Second stack of structural layers 20 is attached to core layer 18 opposite first stack of structural layers 16. Heating layer 22 is attached to second stack of structural layers 20 opposite core layer 18. Impact layer 24 is attached to heating layer 22 opposite second stack of structural layers 20. Impact layer 24 faces top surface 14.

Stacks of structural layers 16 and 20 provide reinforcement to assembly 10. Stacks of structural layers 16 and 20 can be a reinforced polymer, such as a carbon fiber or fiberglass impregnated with a resin system such as a thermoplastic (polyether ether ketone, polycarbonate, polyphenylene sulfide, polyetherimide) or a thermoset (epoxy, phenolic, bismaieimide, benzoxazine). Each of stacks of structural layers 16 and 20 can include a single ply, or a stack of plies, depending on, for example, the material chosen to form the structural layers, or the particular need for reinforcement. Additional and/or alternative structural layers can also be added in other embodiments.

Core layer 18 carries shear loads to stiffen floor panel assembly 10. Core layer 18 can, in an exemplary embodiment, be formed from a high density metallic material, such as aluminum alloy, stainless steel, or titanium, and can further be arranged in a honeycomb structure. Alternatively, core layer 18 can be formed from an expanded honeycomb polymer, such as resin-infused aramids (e.g., Kevlar® or Nomex®), resin-infused carbon fiber or fiberglass, thermoplastic tubing, as well as an open-cell or closed-cell polymer foam. Infusing resins could be epoxy, phenolic, or cyanate ester. Generally, a metallic core layer has greater thermal conductivity than a polymer core layer.

Heating layer 22 can include an electric heating element (not shown). The heating element can be a resistive heating element formed, for example, from a metallic material, Positive Temperature Control (PTC) ceramic, PTC polymer, or carbon allotrope material such as a carbon nanotube (CNT) heater. The heating element can be arranged as an etched foil, wire, or printed-ink element. Other suitable heating elements are contemplated herein. Heating layer 22 can be used to control the temperature of top surface 14 of assembly 10, which can be installed, for example, in an aircraft cabin or cockpit. In certain embodiments, the heating element can extend across the entire area of heating layer 22. In other embodiments, the heating element can be inset some distance from the edges of heating layer 22 in order to protect the element from fluid spills along or damage at the edges of assembly 10.

In prior art embodiments, an impact layer is typically a monolithic material, such as a monolithic metal or a monolithic polymer. In assembly 10, impact layer 24 is a resin-impregnated metal, or a polymer fabric. For instance, impact layer 24 can contain both a fiber matrix and a resin. The fiber matrix of impact layer 24 can be made of fiberglass or carbon fiber materials, a thermoplastic fiber, or a metallic fiber. The resin of impact layer 24 can be a thermoplastic or a thermoset, preferably a resin with a high toughness. Additionally, impact layer 24 can be reinforced with other fibers. Other suitable high-strength, and low-density materials are contemplated herein.

The thermoplastic or elastomer resin of impact layer 24 is a high toughness resin, such as thermoset or a thermoplastic. These types of resins have an ability to stretch to allow deformation while keeping the core sealed from the environment. Impact layer 24 is pre-impregnated, meaning the fiber matrix of impact layer 24 is filled with the high toughness resin prior to assembly of floor panel assembly 10. The materials of impact layer 24 cannot suffer permanent degradation in the full range of temperatures experienced in an aircraft interior, which is typically between −55° C. and 85° C.

Examples of appropriate thermoplastic or elastomer high toughness resins includes thermoplastics such as polyetheretherketone, polyaryletherketones, polycarbonate, polyphenylene sulfide, polyetherimide, polyimide, polymethylmethacrylate (acrylic), polyvinylchloride, polyurethane, and polyamideimide; or thermosets such as epoxy, phenolic, BMI, benzoxazine, or polyurethane. The resin should both allow for ductility and mechanical strength. Typical elongation to break is 30% to 150% and breaking strength is 30 MPa to 120 MPa. The density of the resin is typically 0.9 to 1.7 grams per cubic centimeter.

Additionally, impact layer 24 can be reinforced with other fibers such as aramid fibers (Kevlar®, Nomex®), fiberglass, basalt fibers, carbon fiber, carbon nanotube, nano steel fibers, or wires such as titanium or steel wires. Such fibers (or wires) can provide mechanical support to impact layer 24, spread impact forces, and prevent damage from blunt impact.

Figure 2:
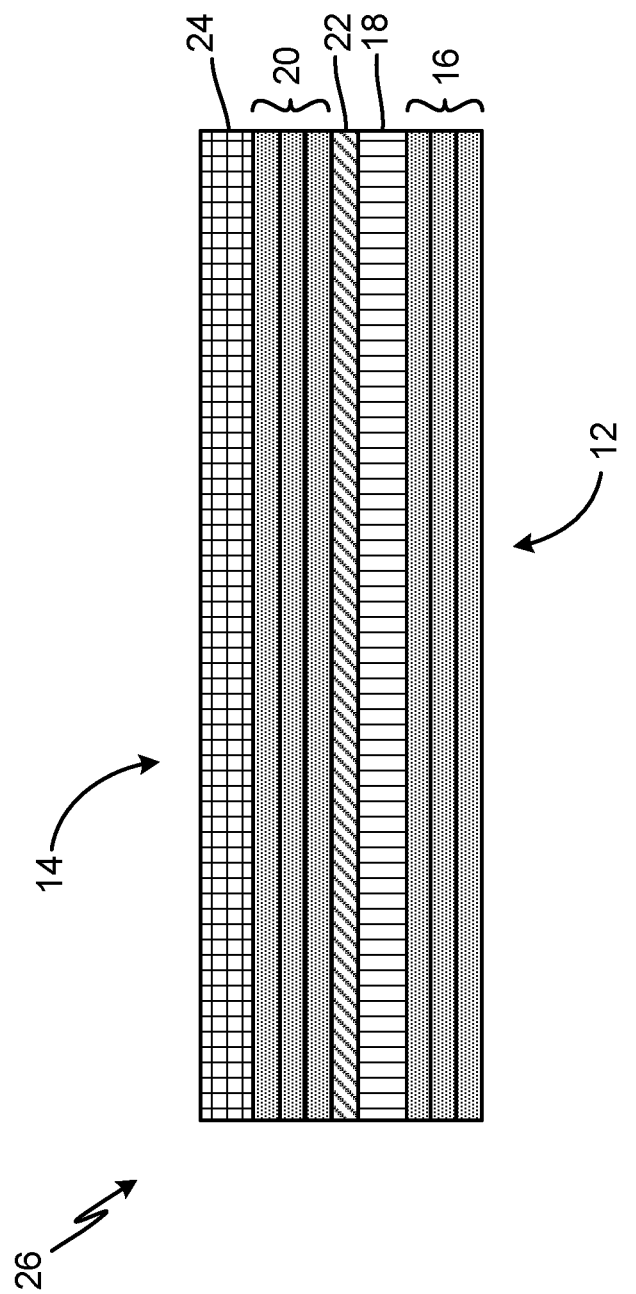
FIG. 2 is a schematic diagram of a heated floor panel assembly in a second embodiment.

FIG. 2 is a schematic diagram of heated floor panel assembly 26. Assembly 26 has many of the same components as assembly 10 in FIG. 1, but arranged in a different configuration.

Here, as in assembly 10, bottom surface 12 of assembly 10 is anchored to an aircraft, while top surface 14 faces the inside of an aircraft cabin or other floor area needing to be heated. Components 16-24 are arranged between bottom surface 12 and top surface 14. First stack of structural layers 16 is attached to bottom surface 12. Core layer 18 is attached to first stack of structural layers 16 opposite bottom surface 12.

However, heating layer 22 is attached to core layer 18 opposite first stack of structural layers 16. Because of this, second stack of structural layers 20 are attached to heating layer 22 opposite core layer 18, and impact layer 24 is attached directly to second stack of structural layers 20. Impact layer 24 faces top surface 14. The location of heating layer 22 adjacent core layer 18, underneath stack of structural layers 20 provides additional protection for the heating element on heating layer 22.

Figure 3:
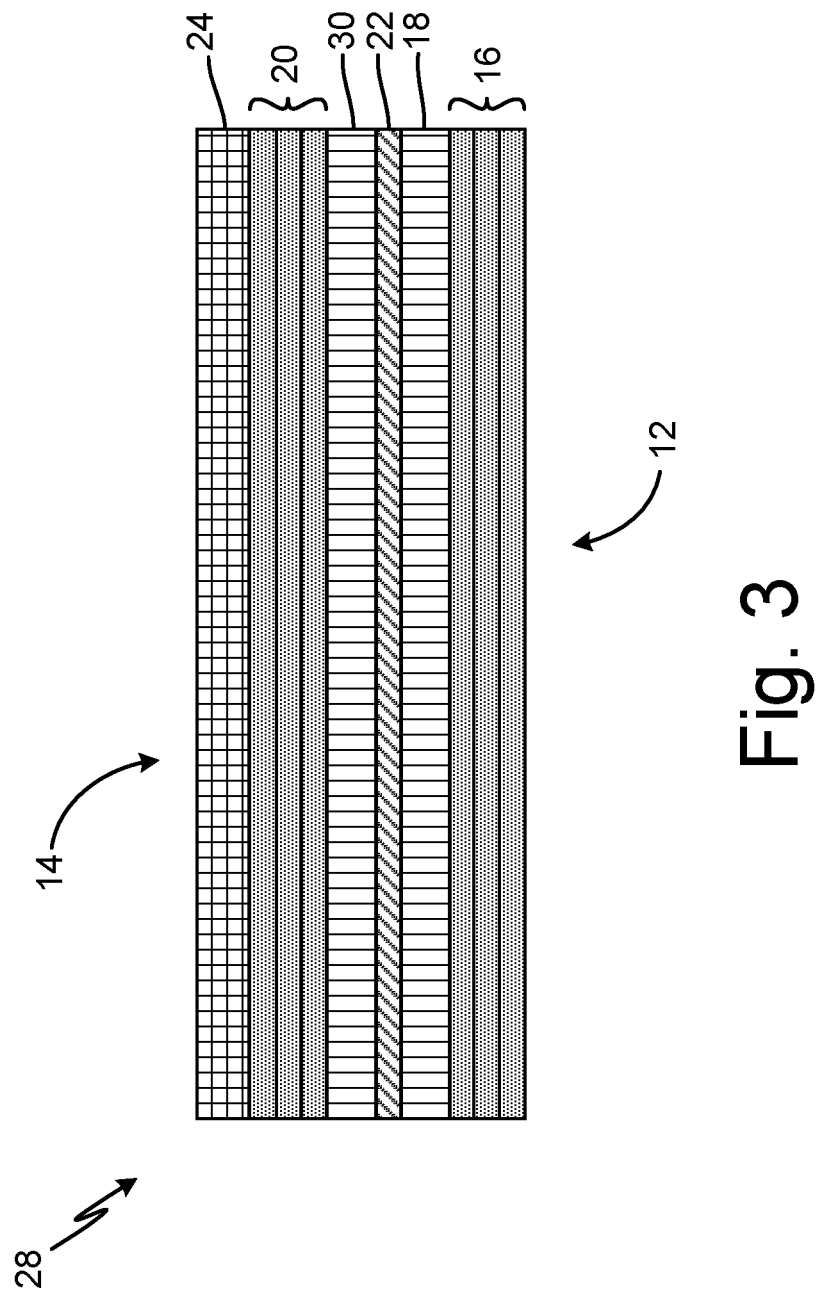
FIG. 3 is a schematic diagram of a heated floor panel assembly in a third embodiment.

FIG. 3 is a schematic diagram of heated floor panel assembly 28. Assembly 28 has many of the same components as assembly 10 in FIG. 1, but arranged in a different configuration. Assembly 28 additionally contains second core layer 30.

Here, heating layer 22 is sandwiched between first core layer 18 and second core layer 30. This allows for further cushioning of heating layer 22. Core layers 18 and 30 can take stress and impacts so that heating layer 22 lasts longer than heating layers protected located closer to an impact layer. As with assembly 10, core layers 18 and 30 provide impact resistance to assembly 10, and carry shear loads to stiffen floor panel assembly 10.

Second core layer 30 can, in an exemplary embodiment, be formed from a high density metallic material, such as aluminum alloy, stainless steel, or titanium, and can further be arranged in a honeycomb structure. First core layer 18 can be formed from an expanded honeycomb polymer, such as resin-infused aramids (e.g., Kevlar® or Nomex®), resin-infused carbon fiber or fiberglass, as well as an open-cell or closed-cell polymer foam. Infusing resins could be epoxy, phenolic, or cyanate ester. In this case, metallic second core layer 30 has greater thermal conductivity than polymer first core layer 18, which improves the thermal transfer properties of assembly 10 in the direction of top surface 14, where heating is desired. In another embodiment, however, both core layers 18 and 30 can be formed from the same material (e.g., metal or polymer), and such an arrangement will depend on factors such as weight limitations and panel heating or insulation requirements.

Figure 4:
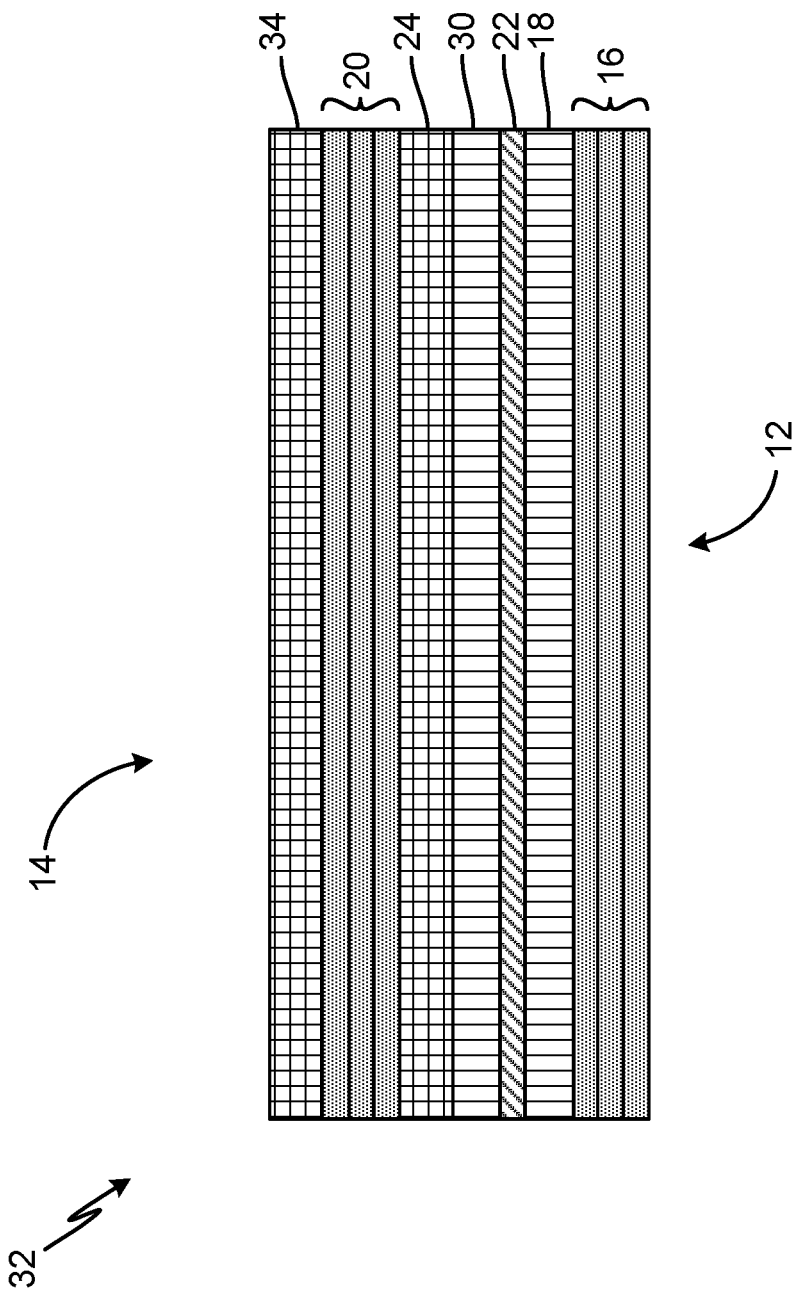
FIG. 4 is a schematic diagram of a heated floor panel assembly in a fourth embodiment.

FIG. 4 is a schematic diagram of heated floor panel assembly 32. Assembly 32 has many of the same components as assembly 28 in FIG. 3, but additionally contains second impact layer 34. Here, first stack of structural layers 20 are attached between first impact layer 24 and second impact layer 34. First stack of structural layers 20 support second impact layer 34, attached to assembly 10 on top surface 14. Meanwhile, first impact layer 24 is embedded within assembly 32 adjacent core layer 30.

Like first impact layer 24, Second impact layer 34 contains both a fiber matrix and a resin. The materials for impact layers 24 and 34 are discussed in more depth in regards to impact layer 24. The fiber matrix of impact layer 34 can be made of fiberglass or carbon fiber. Other suitable high-strength, high-stiffness, and low-density materials are contemplated herein. The resin of impact layer 34 can be a thermoset or a thermoplastic, just as in impact layer 24.

The use of a composite impact layer with a resin impregnated fiber matrix is a lighter, more efficient impact layer for heated floor panel assembly protection. The use of reinforcing fibers or wires further protects the heated floor panel assembly from blunt impact or force. In some embodiments, additional structural, core, or impact layers further protect the heating element without adding significant weight.

Discussion of Possible Embodiments

The following are non-exclusive descriptions of possible embodiments of the present invention.

A floor panel assembly has a bottom surface and a top surface. The floor panel assembly includes a first stack of structural layers adjacent the bottom surface, a first core layer, adjacent the first stack of structural layers, that absorbs shear stress, a second stack of structural layers between the core layer and the top surface, a heating layer between the core layer and the top surface, and an first impact layer between the heating layer and the top surface. The impact layer includes a fiber matrix and a resin infiltrating the fiber matrix. The first stack of structural layers, the core layer, the second stack of structural layers, the heating layer, and the impact layer are bonded together.

The assembly of the preceding paragraph can optionally include, additionally and/or alternatively, any one or more of the following features, configurations and/or additional components:

The first and second stacks of structural layers comprise a reinforced polymer matrix comprising a structural fiber matrix impregnated with a structural resin.

The structural fiber matrix is a carbon fiber or fiberglass.

The structural resin is polyether ether ketone, polycarbonate, polyphenylene sulfide, polyetherimide, epoxy, phenolic, bismaieimide, benzoxazine, or combinations thereof.

The first core layer comprises a high density metallic material in a honeycomb structure selected from the group consisting of aluminum alloys, stainless steel, and titanium.

The first core layer comprises an expanded honeycomb polymer, an open-cell polymer foam, or closed-cell polymer foam.

The heating layer comprises a metallic material, Positive Temperature Control (PTC) ceramic, PTC polymer, or carbon allotrope material.

The fiber matrix of the impact layer comprises fiberglass, carbon fiber, thermoplastic fiber, or metallic fiber.

The resin of the impact layer is selected from the group consisting of polyetheretherketone, polyaryletherketones, polycarbonate, polyphenylene sulfide, polyetherimide, polyimide, polymethylmethacrylate (acrylic), polyvinylchloride, polyurethane, and polyamideimide, epoxy, phenolic, BMI, benzoxazine, and polyurethane.

The thermoplastic resin has an elongation to break of 30% to 150%.

The thermoplastic resin has a breaking strength of 30 MPa to 120 MPa.

The thermoplastic resin has a density of 0.9 g/cm$^3$ to 1.7 g/cm$^3$.

The impact layer further comprises reinforcements selected from the group consisting of aramid fibers, fiberglass, basalt, carbon fiber, carbon nanotube, nano steel, steel wire, titanium wire, and combinations thereof.

The impact layer does not exhibit degradation due to temperature between temperature of −55° C. and 85° C.

The heating layer is adjacent the impact layer.

The heating layer is adjacent the core layer.

The floor panel assembly includes a second core layer, wherein the heating layer is sandwiched by the first core layer and the second core layer.

The second core layer comprises a high density metallic material in a honeycomb structure, an expanded honeycomb polymer, an open-cell polymer foam, or closed-cell polymer foam.

The first core layer comprises a material different than the second core layer.

The floor panel assembly includes a second impact layer between the first stack of structural layers and the core layer.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A floor panel assembly having a bottom surface and a top surface, the floor panel assembly comprising:
    a first stack of structural layers adjacent the bottom surface;
    a first core layer, adjacent the first stack of structural layers, that absorbs shear stress;
    a second core layer between the first core layer and the top surface, that absorbs shear stress;
    a heating layer sandwiched between the first and second core layers;
    a second stack of structural layers between the second core layer and the top surface; and
    a first impact layer between the second stack of structural layers and the top surface, the impact layer comprising:
        a fiber matrix; and
        a thermoplastic resin infiltrating the fiber matrix;
    wherein the first stack of structural layers, the core layer, the second stack of structural layers, the heating layer, and the impact layer are bonded together.

2. The floor panel assembly of claim 1, wherein the first and second stacks of structural layers comprise a reinforced polymer matrix comprising a structural fiber matrix impregnated with a structural resin.

3. The floor panel of claim 2, wherein the structural fiber matrix is a carbon fiber or fiberglass.

4. The floor panel of claim 2, wherein the structural resin is polyether ether ketone, polycarbonate, polyphenylene sulfide, polyetherimide, epoxy, phenolic, bismaleimide, benzoxazine, or combinations thereof.

5. The floor panel assembly of claim 1, wherein the first core layer comprises a high density metallic material in a honeycomb structure selected from the group consisting of aluminum alloys, stainless steel, and titanium.

6. The floor panel assembly of claim 1, wherein the first core layer comprises an expanded honeycomb polymer, an open-cell polymer foam, or closed-cell polymer foam.

7. The floor panel assembly of claim 1, wherein the heating layer comprises a metallic material, Positive Temperature Control (PTC) ceramic, PTC polymer, or carbon allotrope material.

8. The floor panel assembly of claim 1, wherein the fiber matrix of the impact layer comprises fiberglass, carbon fiber, thermoplastic fiber, or metallic fiber.

9. The floor panel assembly of claim 1, wherein the thermoplastic resin is selected from the group consisting of polyetheretherketone, polyaryletherketones, polycarbonate, polyphenylene sulfide, polyetherimide, polyimide, polymethylmethacrylate (acrylic), polyvinylchloride, polyurethane, and polyamideimide, epoxy, phenolic, BMI, benzoxazine, and polyurethane.

10. The floor panel assembly of claim 1, wherein the thermoplastic resin has an elongation to break of 30% to 150%.

11. The floor panel assembly of claim 1, wherein the thermoplastic resin has a breaking strength of 30 MPa to 120 MPa.

12. The floor panel assembly of claim 1, wherein the thermoplastic resin has a density of 0.9 g/cm$^3$ to 1.7 g/cm$^3$.

13. The floor panel assembly of claim 1, wherein the impact layer further comprises reinforcements selected from the group consisting of aramid fibers, fiberglass, basalt, carbon fiber, carbon nanotube, nano steel, steel wire, titanium wire, and combinations thereof.

14. The floor panel assembly of claim 1, wherein the impact layer does not exhibit degradation due to temperature between temperature of −55° C. and 85° C.

15. The floor panel assembly of claim 1, wherein the second core layer comprises a high density metallic material in a honeycomb structure, an expanded honeycomb polymer, an open-cell polymer foam, or closed-cell polymer foam.

16. The floor panel assembly of claim 15, wherein the first core layer comprises a material different than the second core layer.

17. The floor panel assembly of claim 1, further comprising a second impact layer between the second stack of structural layers and the core layer, wherein the first stack of structural layers is adjacent the bottom surface, the first core layer is between the first stack of structural layer and the top surface and adjacent the first stack of structural layers, the heating layer is between the first core layer and the top surface and adjacent the first core layer, the second core layer is between the heating layer and the top surface and adjacent the heating layer, the second impact layer is between the second core layer and the top surface and adjacent the second core layer, the second stack of structural layers is between the second impact layer and the top surface and adjacent the second impact layer, and the first impact layer is between the second stack of structural layers and the top surface.

18. A floor panel assembly having a top and bottom surface and comprising:
- a first stack of structural layers adjacent the bottom surface;
- a core assembly comprising a first core layer that absorbs stress, a second core layer that absorb shear stress, and a heating layer disposed between and contacting each of the first core layer and the second core layer, wherein the core assembly is adjacent the first stack of structural layers;
- a first impact layer between the core assembly and the top surface;
- a second stack of structural layers between the first impact layer and the top surface; and
- a second impact layer between the second stack of structural layers and the top surface, the impact layer comprising:
  - a fiber matrix; and
  - a thermoplastic resin infiltrating the fiber matrix;
- wherein the first stack of structural layers, the core assembly, the first impact layer, the second stack of structural layers, and the second impact layer are bonded together.

19. The floor panel assembly of claim 18, wherein the first and second core layers are formed from a material selected from a group consisting of a high density metallic material in a honeycomb structure, an expanded honeycomb polymer, an open-cell polymer foam, and a closed-cell polymer foam.

20. The floor panel assembly of claim 18, wherein the thermoplastic resin is selected from a group consisting of polyetheretherketone, polyaryletherketones, polycarbonate, polyphenylene sulfide, polyetherimide, polyimide, polymethylmethacrylate (acrylic), polyvinylchloride, polyurethane, and polyamideimide, epoxy, phenolic, BMI, benzoxazine, and polyurethane.

* * * * *

UNITED STATES PATENT AND TRADEMARK OFFICE
CERTIFICATE OF CORRECTION

PATENT NO. : 10,899,427 B2
APPLICATION NO. : 16/026899
DATED : January 26, 2021
INVENTOR(S) : Casey Slane et al.

It is certified that error appears in the above-identified patent and that said Letters Patent is hereby corrected as shown below:

In the Specification

Column 2, Line 24:
Delete "bismaieimide"
Insert --bismaleimide--

Column 4, Line 66:
Delete "bismaieimide"
Insert --bismaleimide--

Signed and Sealed this
Sixteenth Day of March, 2021

Drew Hirshfeld
*Performing the Functions and Duties of the
Under Secretary of Commerce for Intellectual Property and
Director of the United States Patent and Trademark Office*